United States Patent
Kitaguchi et al.

(10) Patent No.: US 11,319,385 B2
(45) Date of Patent: *May 3, 2022

(54) METHOD FOR PRODUCING HYPROMELLOSE ACETATE SUCCINATE

(71) Applicant: SHIN-ETSU CHEMICAL CO., LTD., Tokyo (JP)

(72) Inventors: Taishi Kitaguchi, Niigata (JP); Akiko Tsuchida, Niigata (JP); Akira Kitamura, Niigata (JP); Mitsuo Narita, Niigata (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 7 days.

This patent is subject to a terminal disclaimer.

(21) Appl. No.: 16/521,253

(22) Filed: Jul. 24, 2019

(65) Prior Publication Data

US 2020/0031954 A1 Jan. 30, 2020

(30) Foreign Application Priority Data

Jul. 25, 2018 (JP) .............................. JP2018-139354

(51) Int. Cl.
*C08B 3/16* (2006.01)

(52) U.S. Cl.
CPC ...................... *C08B 3/16* (2013.01)

(58) Field of Classification Search
CPC . C08B 3/16; C08B 11/20; C08B 13/00; C08L 1/32
USPC .......................................................... 536/64
See application file for complete search history.

(56) References Cited

U.S. PATENT DOCUMENTS

| | | | |
|---|---|---|---|
| 4,226,981 A * | 10/1980 | Onda | ................... A61K 9/2866 424/480 |
| 8,101,108 B2 * | 1/2012 | Otoshi | ....................... C08J 5/18 264/211.23 |

FOREIGN PATENT DOCUMENTS

| | | | |
|---|---|---|---|
| EP | 2465899 | 6/2012 | |
| EP | 2465899 A1 * | 6/2012 | ............. C08B 13/00 |
| EP | 3228324 | 10/2017 | |
| EP | 3228324 A1 * | 10/2017 | ............. A61K 47/38 |
| JP | 2011057959 A | 3/2011 | |
| JP | 2015512456 | 4/2015 | |
| JP | 2017186331 A | 10/2017 | |
| WO | 2013/148154 | 10/2013 | |
| WO | 2015041973 A1 | 3/2015 | |

OTHER PUBLICATIONS

Extended European Search Report corresponding to European Application No. 19188172.1 dated Jan. 2, 2020.

"Office Action corresponding to Japanese Application No. 2018-139354 dated Jul. 12, 2021".

* cited by examiner

*Primary Examiner* — Ganapathy Krishnan
(74) *Attorney, Agent, or Firm* — Myers Bigel, P.A.

(57) ABSTRACT

There is provided a method for producing hypromellose acetate succinate (HPMCAS), the method not requiring any special device and facilitating removal of impurities. More specifically, there is provided a method for producing HPMCAS, including an esterification step of esterifying hypromellose with an acetylating agent and a succinoylating agent in the presence of an aliphatic carboxylic acid to obtain a reaction product solution containing HPMCAS; a precipitation step of precipitating the HPMCAS by mixing the reaction product solution with water to obtain a suspension of the precipitated HPMCAS; a neutralization step of neutralizing the suspension with a basic substance to obtain a neutralized suspension; and a washing step of washing the HPMCAS contained in the neutralized suspension to obtain the washed HPMCAS.

8 Claims, No Drawings

METHOD FOR PRODUCING HYPROMELLOSE ACETATE SUCCINATE

RELATED APPLICATION

This application claims priority from Japanese Patent Application No. 2018-139354, filed Jul. 25, 2018, the disclosures of which is incorporated by reference herein in its entirety.

BACKGROUND OF THE INVENTION

The invention relates to a method for producing hypromellose acetate succinate.

Hypromellose acetate succinate (hereinafter also referred to as "HPMCAS") is a polymer having a cellulose skeleton with ether structures formed by introduction of methyl groups ($-CH_3$) and hydroxypropyl groups ($-C_3H_6OH$), and ester structures formed by introduction of acetyl groups ($-COCH_3$) and succinyl groups ($-COC_2H_4COOH$).

HPMCAS is widely used, particularly in the pharmaceutical field such as a field of coating applications in which HPMCAS is used as an enteric polymer material, and a field of solid dispersions in which HPMCAS is used together with a poorly water-soluble drug. Accordingly, HPMCAS desirably contains minimum impurities so that it is important to efficiently remove reaction reagents, by-products and the like in a washing step in the method for producing the HPMCAS.

For example, JP 2015-512456A, which is a Japanese phase publication of WO 2013/148154A, proposes a method for precipitating an esterified cellulose ether from a reaction product mixture, the method comprising steps of: contacting the reaction product mixture with water, and subjecting the resulting mixture of the water and the reaction product mixture to shear force with a shear rate of at least $800\ s^{-1}$.

SUMMARY OF THE INVENTION

However, the method disclosed in JP 2015-512456A requires installation of a high shear device, such as a rotor-stator mixer, a homogenizer, a high shear mill or a high shear pump, to obtain a high shear rate, leading to complication in the equipment. In addition, finely powdered cellulose ether particles exhibit poor filterability during washing so that impurities cannot be removed efficiently.

The invention has been made in these circumstances. An object of the invention is to provide a method for producing HPMCAS, the method not requiring any special device, and facilitating removal of impurities.

As a result of intensive researches to attain the object described above, the inventors have found that the filterability and washability of HPMCAS can be improved by neutralizing a suspension of HPMCAS with a basic substance in the method for producing the HPMCAS, and have completed the present invention.

In an aspect of the invention, there is provided a method for producing hypromellose acetate succinate, comprising an esterification step of esterifying hypromellose with an acetylating agent and a succinoylating agent in the presence of an aliphatic carboxylic acid to obtain a reaction product solution containing hypromellose acetate succinate; a precipitation step of precipitating the hypromellose acetate succinate by mixing the reaction product solution with water to obtain a suspension of the precipitated hypromellose acetate succinate; a neutralization step of neutralizing the suspension with a basic substance to obtain a neutralized suspension; and a washing step of washing the hypromellose acetate succinate contained in the neutralized suspension to obtain the washed hypromellose acetate succinate.

According to the invention, the filterability and washability of HPMCAS can be improved without any special equipment in the method for producing the HPMCAS so that the HPMCAS having impurities reduced can be conveniently produced.

DETAILED DESCRIPTION OF THE PREFERRED EMBODIMENTS

First, there will be described the esterification step of esterifying hypromellose with an acetylating agent and a succinoylating agent in the presence of an aliphatic carboxylic acid to obtain a reaction product solution containing HPMCAS in the method for producing HPMCAS.

Hypromellose (also called hydroxypropyl methylcellulose, hereinafter also abbreviated as "HPMC") is a nonionic, water-soluble cellulose ether. HPMC has a DS of the methoxy group of preferably from 1.10 to 2.20, more preferably from 1.40 to 2.00, and still more preferably from 1.60 to 2.00, from a viewpoint of obtaining HPMC with a low content of insoluble fibers. HPMC has an MS of the hydroxypropoxy group of preferably from 0.10 to 1.00, more preferably from 0.20 to 0.80, and still more preferably from 0.20 to 0.65, from a viewpoint of obtaining HPMC with a low content of insoluble fibers.

The term "DS" stands for a degree of substitution and means the number of alkoxy groups per glucose ring unit of cellulose. The term "MS" stands for a molar substitution and means the average mole number of hydroxyalkoxy groups attached per glucose ring unit of cellulose. Both the DS of methoxy groups and the MS of hydroxypropoxy groups in HPMC can be calculated from the values determined in accordance with the assay procedures described in the Japanese Pharmacopoeia 17th Edition.

HPMC has a viscosity at 20° C., as determined in a 2% by mass aqueous solution of the HPMC, of preferably from 1.0 to 30.0 mPa·s, more preferably from 2.0 to 20.0 mPa·s, from a viewpoint of kneadability during the esterification step. The viscosity at 20° C., as determined in a 2% by mass aqueous solution of the HPMC, may be determined in accordance with the viscosity measurement by capillary tube viscometer described in the Japanese Pharmacopoeia 17th Edition.

The HPMC to be used may be synthesized by a method known in the art, or may be a commercial product.

Examples of the aliphatic carboxylic acid include an aliphatic carboxylic acid having 2 to 4 carbon atoms, such as acetic acid, propionic acid and butyric acid. The acetic acid is preferred from a viewpoint of economy.

The amount of the aliphatic carboxylic acid to be used is preferably from 3.0 to 10.0 mol, more preferably from 4.0 to 8.0 mol, per mol of HPMC, from a viewpoint of dissolving HPMC and enhancing the reaction rate.

Examples of the acetylating agent include acetic anhydride and acetyl chloride. The acetic anhydride is preferred from a viewpoint of economy.

The amount of the acetylating agent to be used is not particularly limited insofar as HPMCAS having a desirable degree of substitution is obtained. It is preferably from 0.2 to 1.5 mol, more preferably from 0.4 to 1.3 mol, per mol of HPMC, from a viewpoint of reaction efficiency.

Examples of the succinoylating agent include succinic anhydride and succinyl dichloride. The succinic anhydride is preferred from a viewpoint of economy.

The amount of the succinoylating agent to be used is not particularly limited insofar as HPMCAS having a desirable degree of substitution is obtained. It is preferably from 0.1 to 1.5 mol, more preferably from 0.2 to 1.2 mol, per mol of HPMC, from a viewpoint of reaction efficiency.

The esterification may be carried out in the presence of a catalyst. The catalyst is preferably an alkali metal salt of a carboxylic acid, such as sodium acetate, from a viewpoint of economy. The catalyst may be used singly or in combination of two or more. A commercially available catalyst may be used.

The amount of catalyst may be appropriately selected in consideration of the desired degree of substitution of HPMCAS. It is preferably from 0.1 to 2.0 mol, more preferably from 0.3 to 1.9 mol, per mol of HPMC, from a viewpoint of reaction efficiency.

The esterification is preferably carried out using a kneader reactor equipped with a twin-shaft stirrer from a viewpoint of reaction efficiency. The reaction temperature in the esterification step is preferably from 60 to 120° C., more preferably from 60 to 100° C., from a viewpoint of reaction rate. The reaction time in the esterification step is preferably from 2 to 8 hours, more preferably from 3 to 6 hours, from a viewpoint of obtaining HPMCAS having a desired degree of substitution.

After the esterification reaction, optional water may be added to the reaction product solution containing HPMCAS for the purpose of treating unreacted acetylating and succinoylating agents to obtain a post-treated reaction product solution containing HPMCAS. Hereinafter, the treatment with water after the esterification is also referred to as "post-treatment".

The amount of water to be added is within the range that does not cause precipitation of HPMCAS, and is preferably from 10 parts by mass to less than 250 parts by mass, more preferably from 50 to 200 parts by mass, relative to 100 parts by mass of starting HPMC, from a viewpoint of preventing a decrease in transportability due to precipitation of HPMCAS.

Next, there will be described the precipitation step of precipitating HPMCAS by mixing the reaction solution containing HPMCAS with water to obtain a suspension of the precipitated HPMCAS.

The temperature of the water is preferably from 5 to 40° C. from a viewpoint of controlling the size of HPMCAS particles in the suspension.

The amount of the water to be used is preferably from 250 to 6,000 parts by mass, more preferably from 300 to 5,000 parts by mass, relative to 100 parts by mass of HPMC used in the esterification step, from a viewpoint of controlling the particle size of HPMCAS in the suspension.

The mixing of the reaction solution containing HPMCAS with water is not particularly limited and may be carried out by any method known in the art.

Next, there will be described the neutralization step of neutralizing the suspension containing HPMCAS with a basic substance to obtain a neutralized suspension.

What will be neutralized includes, for example, the aliphatic carboxylic acid used as the reaction solvent, acetic acid produced as a byproduct during the acetylation of HPMC with acetic anhydride, and acetic acid and succinic acid produced through respective hydrolysis of unreacted acetic anhydride and succinic anhydride.

Examples of the basic substance may include any substance capable of neutralizing the suspension containing HPMCAS. A basic inorganic compound and/or a basic organic compound may be used. The basic substance may be used singly or in combination of two or more. A commercially available basic substance may be used.

Examples of the basic inorganic compound include an alkali metal hydroxide such as sodium hydroxide and potassium hydroxide; an alkaline earth metal hydroxide such as magnesium hydroxide and calcium hydroxide; an alkali metal hydrogen carbonate such as sodium hydrogen carbonate and potassium hydrogen carbonate; and an alkali metal carbonate such as sodium carbonate and potassium carbonate. Examples of the basic organic compound include ammonia and an amine such as pyridine, arginine and lysine.

The basic substance is preferably an alkali metal hydroxide such as sodium hydroxide from a viewpoint of economy.

The amount of the basic substance to be used is not particularly limited and may be such an amount that the neutralized suspension containing HPMCAS has a pH value within the range as described below. For example, the amount may be preferably from more than 0 mol % to 90 mol %, more preferably from more than 10 mol % to 80 mol %, relative to the total moles of the aliphatic carboxylic acid, the acetylating agent and the succinoylating agent.

When the basic substance is solid, it may be added in the solid form as it is, or may be added together with a solvent capable of dissolving the basic substance, or may be added in the solution form after dissolved in a solvent.

For example, sodium hydroxide may be dissolved in water and then used as an aqueous sodium hydroxide solution. The concentration of the aqueous sodium hydroxide solution is preferably from 3.0 to 55.0% by mass from a viewpoint of its handling. The temperature of the aqueous sodium hydroxide solution is preferably from 5 to 40° C. from a viewpoint of its handling.

In the neutralization step, the suspension containing HPMCAS is mixed with the basic substance to obtain a neutralized suspension containing HPMCAS.

The neutralized suspension containing HPMCAS has a pH value of preferably from 2.00 to 6.90, more preferably from 3.00 to 6.50, still more preferably from 4.10 to 5.50, and further more preferably from 4.20 to 5.00, from a viewpoint of improving the filterability and washability of HPMCAS. HPMCAS has succinyl groups ($-COC_2H_4COOH$) so that when it is neutralized, for example, with sodium hydroxide, sodium salts ($-COC_2H_4COONa$) are formed, thereby making HPMCAS water-soluble. To avoid this, the pH is preferably on the acidic side. Even if partial dissolution occurs, HPMCAS can be precipitated by the addition of an acid.

It should be noted that the pH value of the neutralized suspension containing HPMCAS may be determined by the procedure described in "General Tests, Processes and Apparatus: 2. Physical Methods; pH Determination" in the Japanese Pharmacopoeia 17th Edition.

The precipitation step and the neutralization step may be conducted simultaneously. In other words, the neutralization step may be conducted while the precipitation step being conducted, or the precipitation step may be conducted while the neutralization step being conducted.

More specifically, for example, the reaction product solution containing HPMCAS may be mixed with an aqueous solution of the basic substance to cause neutralization and precipitation simultaneously, or the reaction product solution containing HPMCAS may be mixed with water to cause precipitation of the HPMCAS while the basic substance being added to effect the neutralization.

Next, there will be described the washing step of washing HPMCAS contained in the neutralized suspension to obtain washed HPMCAS.

The washing method is not particularly limited. Examples of the washing method include a method comprising steps of: subjecting the neutralized suspension to such a treatment as centrifugation, filtration or decantation to obtain crude HPMCAS; dispersing the crude HPMCAS in water, while stirring with a stirrer; and then removing water used for washing, for example, by centrifugation or filtration; a method comprising a step of subjecting the crude HPMCP to a continuous flow of water; and a method comprising a step of repeatedly replacing a portion of liquid in the neutralized suspension containing HPMCAS by water.

The centrifugation or filtration may be carried out with an apparatus equipped with a screen or filter cloth.

The screen may be made of any of metal, glass or ceramic material. It is preferably made of metal such as stainless steel, aluminum and iron from a viewpoint of durability. The screen may be in any form insofar as it has openings through which the filtration can be carried out. Examples of the screen include metal mesh, punching sheet and molded resin mesh. The punching sheet is preferred from a viewpoint of filterability.

The mesh opening size of the screen may be suitably selected depending on the particle size of crude HPMCAS. The mesh opening size is preferably in the range of from 40 to 2,000 μm from a viewpoint of minimizing the loss of crude HPMCAS. The filtration area of the screen may be suitably selected in consideration of the amount of the reaction product solution and the filtration speed. It is preferably from 0.001 to 1,000 $m^2$ from a viewpoint of filtration speed.

The crude HPMCAS has an average particle size of preferably from 50 to 5,000 μm from a viewpoint of facilitating filtration and drying. The average particle size of the crude HPMCAS may be determined by the wet sieving method described in Japanese Industrial Standard JIS Z 8815.

The crude HPMCAS as obtained, e.g., by centrifugation or filtration, has a water content of preferably from more than 10% to less than 100%, based on the total mass of the crude HPMCAS. The water content of HPMCAS may be determined by the procedure in accordance with "2.41 Loss on Drying Test" under "General Tests, Processes and Apparatus; 2. Physical Methods" in the Japanese Pharmacopoeia 17th Edition. More specifically, the water content of HPMCAS is defined as [{(total mass of HPMCAS)−(absolute dry mass of HPMCAS)}/(total mass of HPMCAS)]× 100%, wherein "total mass of HPMCAS" means the exact mass of HPMCAS determined by the procedure in accordance with "2.41 Loss on Drying Test" in the Japanese Pharmacopoeia 17th Edition, and wherein "absolute dry mass of HPMCAS" means the mass of dried HPMCAS determined in accordance with the procedure described in "2.41 Loss on Drying Test" in the Japanese Pharmacopoeia 17th Edition. The water content of crude HPMCAS can be determined in the same manner by replacing the term "HPMCAS" by "crude HPMCAS".

The temperature of water to be used for washing is preferably from 5° C. to 40° C. from a viewpoint of efficient removal of impurities from HPMCAS.

The amount of water to be used for washing may vary depending on a particular method of washing. For example, when crude HPMCAS obtained by centrifugation or filtration is washed, the water is used in an amount of preferably from 200 to 20,000 parts by mass, relative to 100 parts by mass of crude HPMCAS obtained by centrifugation or filtration, from a viewpoint of obtaining HPMCAS with low impurities.

The water to be used for washing may contain an optional basic substance from a viewpoint of efficient removal of impurities from HPMCAS.

The stirrer may be any stirrer having at least one rotating impeller and being capable of uniformly dispersing HPMCAS. The impeller may be in the form of a paddle, ribbon or anchor.

The peripheral speed of the impeller during stirring is preferably from 0.2 to 100.0 m/s from a viewpoint of preventing HPMCAS from precipitating. The stirring period of time is preferably from 5 to 300 minutes from a viewpoint of uniformly dispersing HPMCAS.

The number of washing may be selected so as to obtain a desired purity of HPMCAS. The number of washing is preferably from 1 to 30 times from a viewpoint of productivity.

HPMCAS thus obtained may be optionally dried. The drying temperature may be preferably from 40 to 100° C., more preferably from 40 to 80° C., from a viewpoint of preventing HPMCAS from agglomerating. The drying period of time may be preferably from 1 to 20 hours, more preferably from 3 to 15 hours, from a viewpoint of preventing HPMCAS from agglomerating.

HPMCAS has a DS of methoxy groups of preferably from 1.10 to 2.20, more preferably from 1.40 to 2.00, and still more preferably from 1.60 to 2.00.

HPMCAS has an MS of hydroxypropoxy groups of preferably from 0.10 to 1.00, more preferably from 0.20 to 0.80, and still more preferably from 0.20 to 0.65.

HPMCAS has a DS of acetyl groups of preferably from 0.10 to 2.50, more preferably from 0.10 to 1.00, and still more preferably from 0.20 to 0.80.

HPMCAS has a DS of succinyl groups of preferably from 0.10 to 2.50, more preferably from 0.10 to 1.00, and still more preferably from 0.10 to 0.60.

HPMCAS has a ratio of the DS of acetyl groups to the DS of succinyl groups of preferably from 0.50 to 4.00, more preferably from 0.80 to 3.70, from a viewpoint of solubility.

It should be noted that the respective molar substitution degrees of methoxy, hydroxypropoxy, acetyl and succinyl groups in HPMCAS may be determined by calculation from values measured in accordance with the method described under the heading of "Hypromellose Acetate Succinate" in Official Monographs of the Japanese Pharmacopoeia 17th Edition.

A 0.43% by mass aqueous sodium hydroxide solution containing HPMCAS at an HPMCAS centration of 2% by mass has a viscosity at 20° C. of preferably from 1.0 to 10.0 mPa·s, and more preferably from 1.5 to 5.0 mPa·s. The viscosity at 20° C. of the 0.43% by mass aqueous sodium hydroxide solution containing HPMCAS at an HPMCAS centration of 2% by mass may be determined in accordance with the method described under the heading of "Hypromellose Acetate Succinate" in Official Monographs of the Japanese Pharmacopoeia 17th Edition.

EXAMPLES

The invention will be further described with reference to the following Examples and Comparative Example. It should not be construed that the invention is limited to or by Examples.

Example 1

In a 5-L kneader reactor equipped with a twin-shaft stirrer, 860.0 g g of HPMC having a DS (methoxy) of 1.84, an MS (hydroxypropoxy) of 0.24, and a viscosity at 20° C. of 3.0 mPa·s as determined in a 2% by mass aqueous solution, 1376.0 g of acetic acid, 510.0 g of acetic anhydride, 115.0 g of succinic anhydride, and 372.6 g of sodium acetate were placed, and stirred at 85° C. for 5 hours to obtain 3233.6 g of a reaction product solution containing HPMCAS. Then, 963.2 g of water was added to the reaction product solution to obtain 4196.8 g of a post-treated reaction product solution containing HPMCAS. Table 1 shows the equivalence relationship between the reagents used for the esterification reaction.

Fifty grams of the post-treated reaction product solution containing HPMCAS was mixed with 150 g of a 5.7% by mass aqueous NaOH solution of 13.5° C. as the simultaneous precipitation and neutralization steps to obtain a neutralized suspension containing HPMCAS. The neutralized suspension had a pH value of 4.96, and the average particle diameter ($D_{50}$) of crude HPMCAS before washing was 417 μm.

The average particle diameter of HPMCAS was determined in accordance with the wet sieving test method described in Japanese Industrial Standard JIS Z 8815. More specifically, the average particle diameter is determined based on the graph in which a sieve opening size is assigned as a vertical axis, while a cumulative mass percentage (%) retained on a sieve is assigned as a horizontal axis. The average particle diameter is a value of the sieve opening size at the intersection between a horizontal line of 50% cumulative mass percentage retained on the sieve and a line formed from the two plotted points which are closest to 50% cumulative mass percentage and between which 50% cumulative mass percentage intervenes. The cumulative mass percentage (%) retained on each sieve was calculated from the mass of crude HPMCAS retained on each sieve by using the method in which the suspension containing HPMCAS was poured onto the top sieve, then a continuous flow of pure water was applied onto HPMCAS retained on the top sieve until the liquid passing through the top sieve became transparent, followed by applying a continuous flow of pure water onto HPMCAS retained on the second sieve from the top until the liquid passing through the second sieve became transparent, and followed by applying a continuous flow of pure water onto HPMCAS retained on each sieve in the same manner in the order of from top to bottom, and then crude HPMCAS retained on each sieve was transferred into a weighing container. Each sieve had a plain weave net and was of a cylindrical shape with a diameter of 200 mm. The sieves had opening sizes of 4,000 μm, 1,700 μm, 1,000 μm, 500 μm, 250 μm, 177 μm, 150 μm, 106 μm and 75 μm, respectively. A manual wet sieving method was used.

Next, the neutralized suspension was filtered through a screen (stainless steel punching sheet with a filtration area of 10.2 cm$^2$) with an opening size of 300 μm until no further filtrate was obtained, to obtain 70 g of crude HPMCAS. The time between the start of pouring the neutralized suspension onto the screen and the end at which no further filtrate was obtained was also measured. The crude HPMCAS obtained by the filtration had a water content of 82%.

The crude HPMCAS obtained by the filtration was dispersed in 600 g of water of 13.5° C., stirred with a stirrer having a rotating paddle-like impeller at a peripheral speed of 0.65 m/s for 10 minutes, and filtered through a screen (stainless steel punching sheet with a filtration area of 10.2 cm$^2$) with an opening size of 300 μm until no further filtrate was obtained. Then, this washing procedure was repeated twice to obtain a wet cake containing HPMCAS. The wet cake was dried in an air-blowing dryer at 50° C. for 12 hours to obtain dried HPMCAS.

The contents of succinic acid and acetic acid in the dried HPMCAS were determined in accordance with the method described in the Japanese Pharmacopoeia 17th Edition. The results are shown in Table 2.

Example 2

A post-treated reaction product solution containing HPMCAS was obtained in the same manner as in Example 1. Fifty grams of the post-treated reaction product solution containing HPMCAS was mixed with 150 g of water of 13.5° C. to obtain a suspension of precipitated HPMCAS.

The HPMCAS suspension was mixed with 5.4 g of a 49% by mass aqueous NaOH solution of 20° C. to obtain a neutralized suspension containing HPMCAS. The neutralized suspension had a pH value of 4.41, and an average particle diameter ($D_{50}$) of the crude 1HPMCAS before washing was 415 μm.

The neutralized suspension was filtered through a screen (stainless steel punching sheet with a filtration area of 10.2 cm$^2$) with an opening size of 300 μm until no further filtrate was obtained, to obtain 63 g of crude HPMCAS. The time between the start of pouring the neutralized suspension onto the screen and the end at which no further filtrate was obtained was measured. The crude HPMCAS obtained by the filtration had a water content of 80%.

The crude HPMCAS was dispersed in 600 g of water of 13.5° C., stirred with a stirrer having a rotating paddle-like impeller at a peripheral speed of 0.65 m/s for 10 minutes, and filtered through a screen (stainless steel punching sheet with a filtration area of 10.2 cm$^2$) with an opening size of 300 m until no further filtrate was obtained.

Then, this washing procedure was repeated twice to obtain a wet cake containing HPMCAS. The wet cake was dried in an air-blowing dryer at 50° C. for 12 hours to obtain dried HPMCAS.

The contents of succinic acid and acetic acid in the dried HPMCAS were determined in accordance with the method described in the Japanese Pharmacopoeia 17th Edition. The results are shown in Table 2.

Example 3

HPMCAS was obtained in the same manner as in Example 2 except that the 49% by mass aqueous NaOH solution of 20° C. was used in an amount of 14.5 grams. The results are shown in Table 2.

Example 4

HPMCAS was obtained in the same manner as in Example 2 except that the 49% by mass aqueous NaOH solution of 20° C. was used in an amount of 21.7 grams. The results are shown in Table 2.

Comparative Example 1

HPMCAS was obtained in the same manner as in Example 1 except that 600 g of water of 13.5° C. was used in place of 150 g of the 5.7% by mass aqueous NaOH solution of 13.5° C., thereby obtaining an un-neutralized suspension containing HPMCAS. An average particle diameter ($D_{50}$) of crude HPMCAS in the un-neutralized suspension before washing was 420 μm. The results are shown in Table 2.

It is found that the filtration time can be reduced by the neutralization treatment of the suspension containing precipitated HPMCAS despite the fact that an average particle diameter of crude HPMCAS in the neutralized suspension before washing was almost the same as that of crude HPMCAS in the un-neutralized suspension before washing. It is considered that this is because HPMCAS particles, which are soft and adhesive in the presence of acetic acid, become less adhesive by the neutralization treatment, thereby reducing filter clogging.

There was a concern that the neutralization treatment with a basic substance might decrease the yield due to dissolution of HPMCAS having carboxy groups. However, it is found in Examples 1-4 that the filtration time can be reduced, while maintaining the yields at a level of 75% or higher relative to the yield in Comparative Example 1.

It is also found that the washability of removing carboxylic acid compounds such as acetic acid and succinic acid is improved by the neutralization treatment of the suspension containing precipitated HPMCAS. It is considered that this is because HPMCAS particles become less adhesive by the neutralization treatment, thereby preventing the particles from agglomerating each other, and making impurities less susceptible to being entrapped in the particles. Another factor for the improved washability is considered to be due to enhanced solubility of carboxylic acid compounds in water by the neutralization treatment.

The invention claimed is:

1. A method for producing hypromellose acetate succinate, comprising:
   an esterification step of esterifying hypromellose with an acetylating agent and a succinoylating agent in the presence of an aliphatic carboxylic acid as a solvent and an alkali metal salt of a carboxylic acid as a catalyst to obtain a reaction product solution containing hypromellose acetate succinate;
   a precipitation step of precipitating the hypromellose acetate succinate by mixing the reaction product solution with water to obtain a suspension of the precipitated hypromellose acetate succinate;
   a pH-increasing step of mixing the suspension with a basic substance to obtain a pH-increased suspension having a pH value of from 4.10 to 5.50; and
   a washing step of washing the hypromellose acetate succinate contained in the pH-increased suspension to obtain the washed hypromellose acetate succinate.

2. The method for producing hypromellose acetate succinate according to claim 1, wherein the precipitation step and the pH-increasing step are conducted simultaneously.

3. The method for producing hypromellose acetate succinate according to claim 1, wherein the pH-increased suspension has a pH value of from 4.41 to 5.16.

4. The method for producing hypromellose acetate succinate according to claim 1, wherein the basic substance is an alkali metal hydroxide.

5. The method for producing hypromellose acetate succinate according to claim 2, wherein the pH-increased suspension has a pH value of from 4.41 to 5.16.

6. The method for producing hypromellose acetate succinate according to claim 2, wherein the basic substance is an alkali metal hydroxide.

TABLE 1

| HPMC | | aliphatic monocarboxylic acid acetic acid | | acetylating agent acetic anhydride | | succinoylating agent succinic anhydride | | catalyst sodium acetate | |
|---|---|---|---|---|---|---|---|---|---|
| (g) | (mol) | (g) | (mol/molHPMC) | (g) | (mol/molHPMC) | (g) | (mol/molHPMC) | (g) | (mol/molHPMC) |
| 860.0 | 4.3 | 1376.0 | 5.4 | 510.0 | 1.2 | 115.0 | 0.3 | 372.6 | 1.1 |

TABLE 2

| | neutralization step | | filterability | | HPMCAS | | | | | washability | |
|---|---|---|---|---|---|---|---|---|---|---|---|
| | | | filtration | relative yield | | | | | | succinic acid content in | acetic acid content in |
| | basic substance | pH | time (sec) | of crude HPMCAS | viscosity (mPa·s) | MeO group | HPO group | Ac group | Suc group | Ac/Suc | dried product (% by weight) | dried product (% by weight) |
| Example1 | NaOH | 4.96 | 131 | 80.6 | 2.9 | 1.88 | 0.25 | 0.65 | 0.19 | 3.42 | 0.14 | 0.28 |
| Example2 | NaOH | 4.41 | 110 | 85.2 | 2.9 | 1.88 | 0.25 | 0.65 | 0.19 | 3.42 | 0.14 | 0.32 |
| Example3 | NaOH | 4.81 | 123 | 78.8 | 2.9 | 1.88 | 0.25 | 0.65 | 0.19 | 3.42 | 0.16 | 0.33 |
| Example4 | NaOH | 5.16 | 215 | 75.4 | 2.9 | 1.88 | 0.25 | 0.65 | 0.19 | 3.42 | 0.17 | 0.30 |
| Comp. Ex. 1 | — | 3.91 | 272 | 100.0 | 2.9 | 1.88 | 0.25 | 0.65 | 0.19 | 3.42 | 0.22 | 0.37 |

*MeO means methoxy, HPO means hydroxypropoxy, Ac means acetyl and Suc means succinyl.

7. The method for producing hypromellose acetate succinate according to claim 3, wherein the basic substance is an alkali metal hydroxide.

8. The method for producing hypromellose acetate succinate according to claim 5, wherein the basic substance is an alkali metal hydroxide.

\* \* \* \* \*

UNITED STATES PATENT AND TRADEMARK OFFICE
CERTIFICATE OF CORRECTION

| | |
|---|---|
| PATENT NO. | : 11,319,385 B2 |
| APPLICATION NO. | : 16/521253 |
| DATED | : May 3, 2022 |
| INVENTOR(S) | : Kitaguchi et al. |

It is certified that error appears in the above-identified patent and that said Letters Patent is hereby corrected as shown below:

In the Specification

Column 8, Line 21: Please correct "1HPMCAS" to read -- HPMCAS --

Column 8, Line 37: Please correct "300 m" to read -- 300 μm --

Signed and Sealed this
Fifteenth Day of November, 2022

Katherine Kelly Vidal
*Director of the United States Patent and Trademark Office*